H. O. WILSON.
TIRE.
APPLICATION FILED DEC. 3, 1910.

1,004,950.

Patented Oct. 3, 1911.

2 SHEETS—SHEET 1.

Witnesses
W. S. McDowell

Inventor
Howard O Wilson
By Victor J. Evans
Attorney

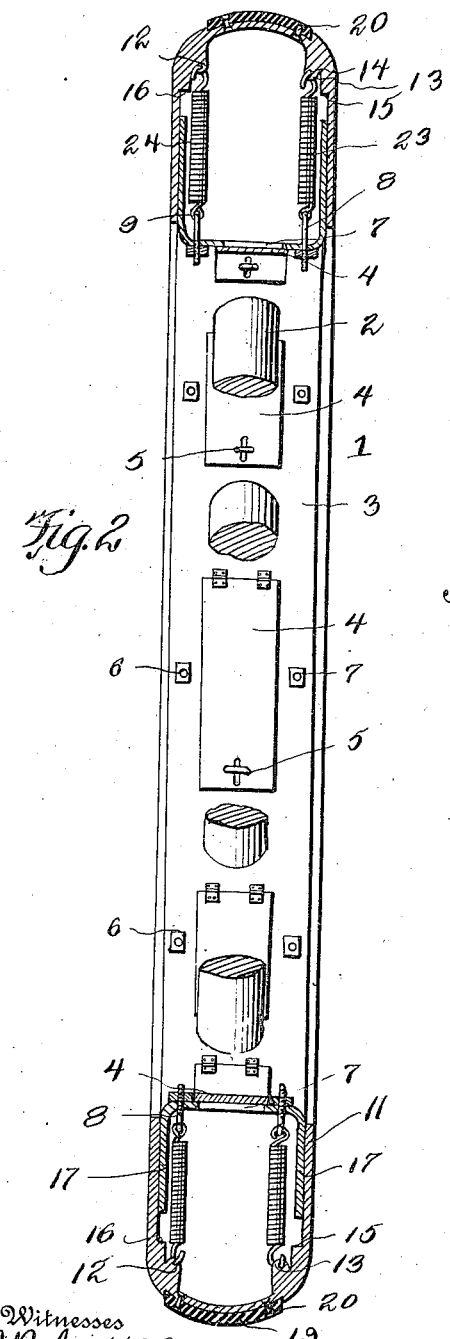

UNITED STATES PATENT OFFICE.

HOWARD O. WILSON, OF AINSWORTH, NEBRASKA.

TIRE.

1,004,950.  Specification of Letters Patent.  Patented Oct. 3, 1911.

Application filed December 3, 1910. Serial No. 595,398.

*To all whom it may concern:*

Be it known that I, HOWARD O. WILSON, a citizen of the United States, residing at Ainsworth, in the county of Brown and State of Nebraska, have invented new and useful Improvements in Tires, of which the following is a specification.

This invention relates to improvements in cushion tires for vehicle wheels, its object being to provide a tire for automobiles, vehicles, bicycles and the like which shall have all of the resiliency of a pneumatic tire, while being free from its disadvantages such as its tendency to puncture, rendering the said pneumatic wheel short lived.

Other objects and advantages will be described in this specification and particularly set forth in the appended claims.

Figure 1:
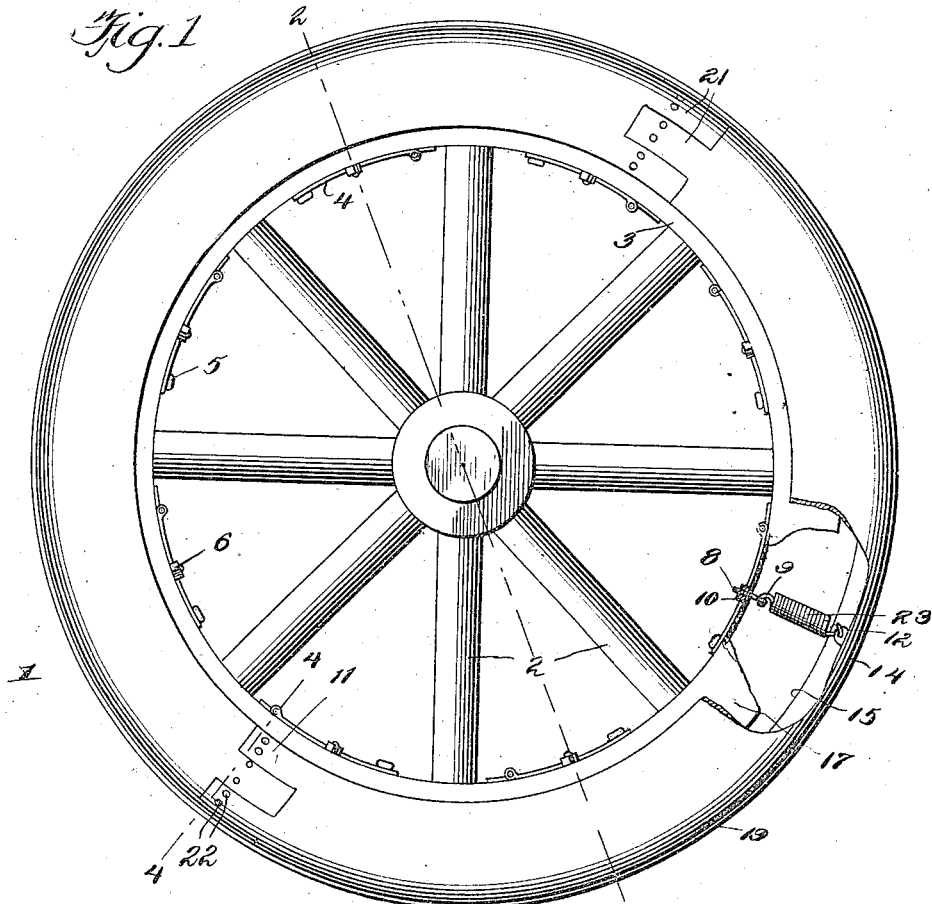
Figure 5:
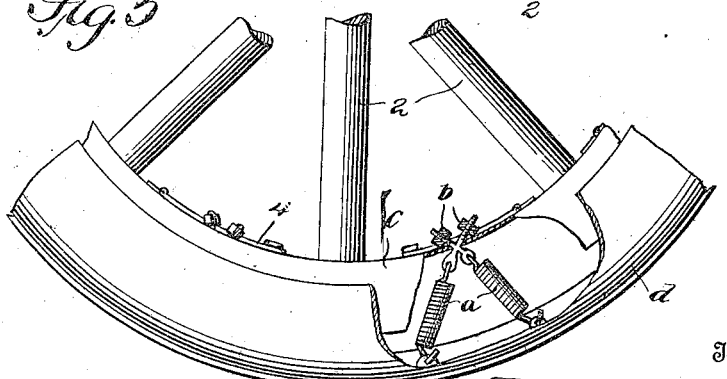

In the accompanying drawings there has been illustrated a simple and preferred embodiment of the improvement, and in which drawings, Figure 1 is a side elevation of a wheel provided with the improved tire. Fig. 2 is a longitudinal sectional view of the tire. Fig. 3 is an enlarged detail sectional view of the outer or tread portion of the tire. Fig. 4 is a transverse sectional view taken upon the line 4—4 of Fig. 1. Fig. 5 is a detail side elevation, partly in section, illustrating the employment of a plurality of springs. Fig. 6 is a detail perspective view of the ends of the tire separated.

In the accompanying drawings the numeral 1 designates an ordinary vehicle wheel. This wheel 1 is centrally provided with the usual boxing from which radiate the spokes 2. These spokes 2 are each connected with a rim or felly designated by the numeral 3. The felly or rim, of course, is arranged concentrically with the boxing of the vehicle and the said felly is of a cross sectional U-shaped formation, as clearly illustrated in Fig. 2 of the drawings. This felly 2 has its inner face provided with a plurality of centrally arranged doors 4, the latter being positioned between each pair of spokes 2, and the said doors are provided with suitable latches or locks 5, as shown in Fig. 2 of the drawings. The inner face of the felly 3, centrally of and adjacent each of the openings provided for the doors 4 are formed with recesses or openings 6 and 7, and these openings are adapted for the reception of the threaded extending members 8 provided by suitable eye bolts 9. The outer extending portion 8 of the eye bolts 9 are each provided with suitable nuts 10, the purpose of which will presently be set forth.

The numeral 11 designates the outer or tread section of the tire. This section 11 is also substantially U-shaped in cross section and has its inner face formed with a plurality of upwardly extending nibs 12 and 13, and each of these nibs is formed with openings 14, the purpose of which will presently be set forth. The side walls of the member 11 have their inner faces raised a suitable distance and terminate in the offset shoulders 15 and 16. The distance between the reduced portions of the said member 11 is slightly lesser than the width of the felly section 3 and the said member 11 is adapted to straddle the offset side members 17 of the said felly section.

It will be noted that by providing the section 11 with the offset shoulders 15 the movement of the sections 3 and 11 will be effectively limited in one direction. The outer face or periphery of the section 11 is formed with an angular recess or depression 18, and positioned within the said recess is a tread 19, the latter being constructed of rubber or other suitable preferably resilient material. The tread 19 is secured to the face of the section 11 through the medium of suitable bolt members 20. The tread member 11 is preferably formed of a pair of sections, as clearly illustrated in Fig. 1 of the drawings, the said sections adjacent their ends being formed with spaced projecting tongues 21 and the tongues of one of the sections are adapted to overlie the tongues of the second section and each of the said tongues are connected together through the medium of removable securing elements 22. Connected with the eye bolts 9 and with the openings 14 provided by the members 12 and 13 are torsional springs 23 and 24, the latter being adapted to exert pressure between the rim sections so as to normally force the tread section 11 away from the felly section 3.

From the above description taken in connection with the accompanying drawings, it will be noted that I have provided an extremely simple and thoroughly effective wheel and tire for the wheel, one wherein the outer or tread section may be easily and quickly positioned upon the inner or felly section, one wherein the springs 23 and 24 may be adjusted through the medium of the nuts 10, and one which provides for the ready access to the springs for the removal or positioning of the same should one of the said springs lose its rigidity and be replaced by a new spring.

In Fig. 5 of the drawings, I have illustrated a slightly modified form of the device. In this figure a pair of springs *a* are employed. The springs are connected with the sections in a manner similar to that heretofore set forth, but as clearly shown the said springs are arranged at an angle or inclined toward each other, and the securing nuts for the bolts *b* are also arranged at an angle with relation to the rim *c*. By this arrangement a greater amount of resiliency is afforded the tread *d*, as will be readily understood.

Having thus described the invention, what I claim is:—

1. A wheel having a substantially cross sectional U-shaped felly, a tread member also of a substantially U-shaped cross sectional formation straddling the felly, resilient members positioned between the sections, spokes for the said wheel, the inner face of the said felly being formed with a plurality of doors adapted to provide means whereby access to the resilient members may be had for the purpose of repairing the same, each of the said doors positioned between the spokes, and a means to retain the doors in locked positions.

2. A wheel having a substantially U-shaped felly, a tread member also of a substantially U-shaped cross sectional formation straddling the felly, resilient members positioned between the sections, the said tread member having the inner surface of its sides formed with reduced portions to provide shoulders, adapted to contact and limit the movement of the felly in one direction, the inner surface of the said tread member being provided with a plurality of upwardly extending portions adjacent the said shoulders, the said portions being further provided with eyes adapted to receive one end of the resilient member to retain the same in position within the sections, the said tread member being formed in sections, the said sections having their ends provided with a plurality of slits to form tongues, and the tongues of one section adapted to overlap the tongues of the other section, and removable elements connecting the sections.

In testimony whereof I affix my signature in presence of two witnesses.

HOWARD O. WILSON.

Witnesses:
JOHN E. HUMPHREYS,
FRANK S. TOLIVER.

Copies of this patent may be obtained for five cents each, by addressing the "Commissioner of Patents, Washington, D. C."